(12) United States Patent
Yoon

(10) Patent No.: US 9,694,825 B2
(45) Date of Patent: Jul. 4, 2017

(54) CLUTCH BURST PREVENTION METHOD

(71) Applicants: Hyundai Motor Company, Seoul (KR); Kia Motors Corp., Seoul (KR)

(72) Inventor: Young Min Yoon, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/941,553

(22) Filed: Nov. 14, 2015

(65) Prior Publication Data

US 2017/0043775 A1 Feb. 16, 2017

(30) Foreign Application Priority Data

Aug. 12, 2015 (KR) .................. 10-2015-0114014

(51) Int. Cl.
| | | |
|---|---|---|
| *B60W 10/06* | (2006.01) | |
| *B60W 30/186* | (2012.01) | |
| *B60W 10/02* | (2006.01) | |
| *B60W 10/113* | (2012.01) | |
| *F02D 41/26* | (2006.01) | |
| *F02D 41/02* | (2006.01) | |
| *F02D 41/12* | (2006.01) | |

(52) U.S. Cl.
CPC .......... *B60W 30/186* (2013.01); *B60W 10/02* (2013.01); *B60W 10/06* (2013.01); *B60W 10/113* (2013.01); *F02D 41/022* (2013.01); *F02D 41/12* (2013.01); *F02D 41/26* (2013.01); *B60W 2510/102* (2013.01); *B60W 2510/1005* (2013.01); *B60W 2510/1015* (2013.01); *B60W 2550/142* (2013.01); *B60W 2710/021* (2013.01); *B60W 2710/0666* (2013.01); *B60W 2710/1005* (2013.01); *Y10S 477/901* (2013.01); *Y10S 477/906* (2013.01); *Y10T 477/6403* (2015.01); *Y10T 477/6437* (2015.01); *Y10T 477/68* (2015.01)

(58) Field of Classification Search
CPC .. B60W 30/186; B60W 10/02; B60W 10/113; B60W 10/06; B60W 2510/1005; B60W 2510/1015; B60W 2550/142; B60W 2710/021; B60W 2710/06669; B60W 2710/1005; Y10T 477/6403; Y10T 477/6437; Y10T 477/68; Y10S 477/901; Y10S 477/906
USPC .......................................... 701/62
See application file for complete search history.

(56) References Cited

U.S. PATENT DOCUMENTS

| 6,953,417 | B2 | 10/2005 | Koenig | |
|---|---|---|---|---|
| 8,808,137 | B2 * | 8/2014 | Kaltenbach | B60K 6/48 477/109 |

(Continued)

FOREIGN PATENT DOCUMENTS

| JP | 2002-104004 A | 4/2002 |
|---|---|---|
| JP | 2013-53732 A | 3/2013 |
| KR | 10-2014-0073306 A | 6/2014 |

*Primary Examiner* — Roger Pang
(74) *Attorney, Agent, or Firm* — Morgan Lewis & Bockius LLP

(57) ABSTRACT

A clutch burst prevention method for preventing a non-drive input shaft clutch of a vehicle provided with a double clutch transmission (DCT) from damage may include a torque reduction operation of reducing a torque of an engine by an ECU when a stuck phenomenon occurs on a shift gear of the non-drive input shaft.

5 Claims, 3 Drawing Sheets

(56) References Cited

U.S. PATENT DOCUMENTS

| | | | |
|---|---|---|---|
| 2005/0107214 A1* | 5/2005 | Koenig | F16H 61/12 477/174 |
| 2008/0234105 A1* | 9/2008 | Sakamoto | F16H 61/12 477/124 |
| 2009/0264254 A1 | 10/2009 | Jaeggle et al. | |
| 2012/0302399 A1 | 11/2012 | Murakami | |
| 2015/0360676 A1* | 12/2015 | Nakano | B60K 6/547 477/5 |
| 2016/0017989 A1* | 1/2016 | Shigenaga | F16H 61/12 192/3.29 |
| 2016/0138709 A1* | 5/2016 | Yoon | F16H 61/12 701/51 |

* cited by examiner

<NORMAL>  <BURST OCCURRENCE>

CLUTCH BURST PREVENTION METHOD

CROSS REFERENCE TO RELATED APPLICATION

The present application claims priority to Korean Patent Application No. 10-2015-0114014, filed Aug. 12, 2015, the entire contents of which is incorporated herein for all purposes by this reference.

BACKGROUND OF THE INVENTION

Field of the Invention

The present invention relates to a clutch burst prevention method, and more particularly to a clutch burst prevention method for a vehicle with a double clutch transmission (DCT) which can prevent a clutch from bursting when a stuck phenomenon occurs on a low gear of a non-drive input shaft.

Description of Related Art

A double clutch pack of a DCT is an assembly of various parts. When rotating at a high speed (10000 revolutions per minute (RPM) or more), these parts may be disassembled or damaged by centrifugal force and, simultaneously, noise and shock may be generated. As such, if damage to the clutch, e.g., burst, is caused, the power transmission function of the clutch is lost, thus creating danger to occupants of the vehicle. Therefore, there is the need for preventing a clutch burst phenomenon from being caused under any driving conditions.

When the clutch is directly connected to an engine, in other words, it is in a state related to a drive input shaft. the RPM of the drive input shaft depends on the RPM of the engine. However, when the clutch is in a state related to a non-drive input shaft, the RPM thereof varies depending on the driving speed of the vehicle and an engaged gear stage.

When a low shift gear is pre-engaged with the non-drive input shaft while the vehicle moves at high speed, the RPM of the clutch is abnormally increased, whereby a clutch burst phenomenon may be caused. An image of a clutch damaged by such a clutch burst phenomenon is shown in FIG. 1.

Particularly, if a low gear of the non-drive input shaft is engaged when the vehicle moves at high speed and a failure of a gear actuator in which the low gear is not disengaged is caused, the probability of occurrence of the clutch burst phenomenon is increased. Such a failure is illustrated in FIG. 2. Referring to FIG. 2, a drive input shaft is coupled to an engine, and drive force is transmitted to wheels through a sixth gear. If under normal circumstances, a non-drive shaft should be coupled to a fifth or seventh gear to prepare shifting gears. However, due to occurrence of a failure, the non-drive shaft is in a state in which it is coupled to a first gear.

Consequently, the RPM of the wheels that are rotated at high speed is amplified by the first gear, whereby the first clutch, that is, the clutch that is mounted to the non-drive rotating shaft, is rotated at abnormally high speed. Therefore, a control method of limiting the RPM of the non-drive rotating shaft to a predetermined level or less when the above-mentioned problem occurs is required.

In a conventional DCT clutch control method according to the related art, it was determined that, if the RPM of an input shaft is an RPM at which clutch burst occurs or more when synchronization starts by means of a shifting operation, the transmission malfunctions. In this way, failure is diagnosed in early stage, whereby additional damage can be prevented.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention arc directed to providing a clutch burst prevention method which can prevent a clutch of a non-drive input shaft of a vehicle provided with a DCT from bursting and, in particularly, prevent the clutch from bursting even when a stuck phenomenon occurs on a shift gear of the non-drive input shaft while the vehicle is moving on a downward slope.

According to various aspects of the present invention, a clutch burst prevention method for preventing a non-drive input shaft clutch of a vehicle provided with a double clutch transmission (DCT) from damage may include a torque reduction operation of reducing a torque of an engine by an ECU when a stuck phenomenon occurs on a shift gear of the non-drive input shaft.

The clutch burst prevention method may further include, after the torque reduction operation, a downward-slope determination operation of determining whether the vehicle is moving on a downward slope, and an operation of changing the non-drive input shaft and a drive input shaft with each other when it is determined that the vehicle is moving on the downward slope.

The clutch burst prevention method may further include, before the torque reduction operation, an over-rotation determining operation of determining whether revolutions per minute (RPM) of the non-drive input shaft is greater than or equal to a clutch burst reference RPM value, and a gear separation operation of separating the shift gear of the non-drive input shaft when the RPM of the non-drive input shaft is greater than or equal to the clutch burst reference RPM value, in which, in the gear separation operation, when the shift gear is not separated, it is determined that a stuck phenomenon has occurred.

The downward-slope determination operation may include determining that the vehicle is moving on the downward slope when the RPM of the non-drive input shaft is not reduced even when the torque of the engine is reduced in the torque reduction operation.

When the shift gear of the non-drive input shaft on which the stuck phenomenon occurs is a first or second gear, the torque reduction operation may be conducted.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a clutch burst prevention method according various embodiments of the present invention will be described in detail with reference to the attached drawings.

Although simply explained in the above description of the related art, a Double Clutch Transmission (DCT) refers to a technology which includes two input shafts and alternates a drive shaft and a non-drive shaft whenever shifting gears. This technology is well known, and thus further explanation thereof will be omitted.

Figure 1:
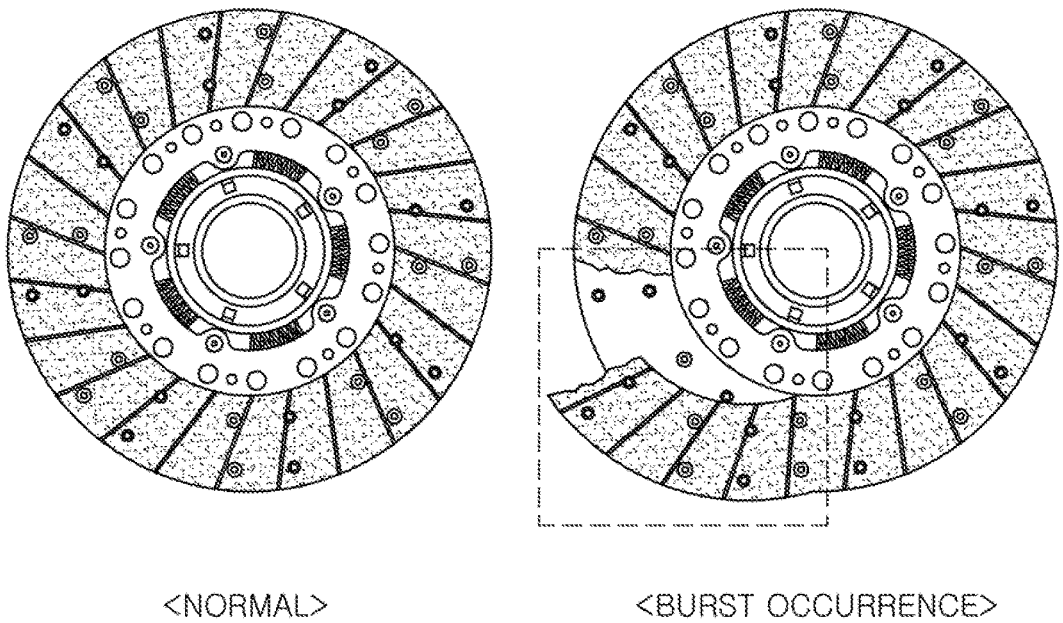
FIG. 1 shows photographs comparing a normal clutch and a clutch damaged by a clutch burst phenomenon according to the related art.
Figure 2:
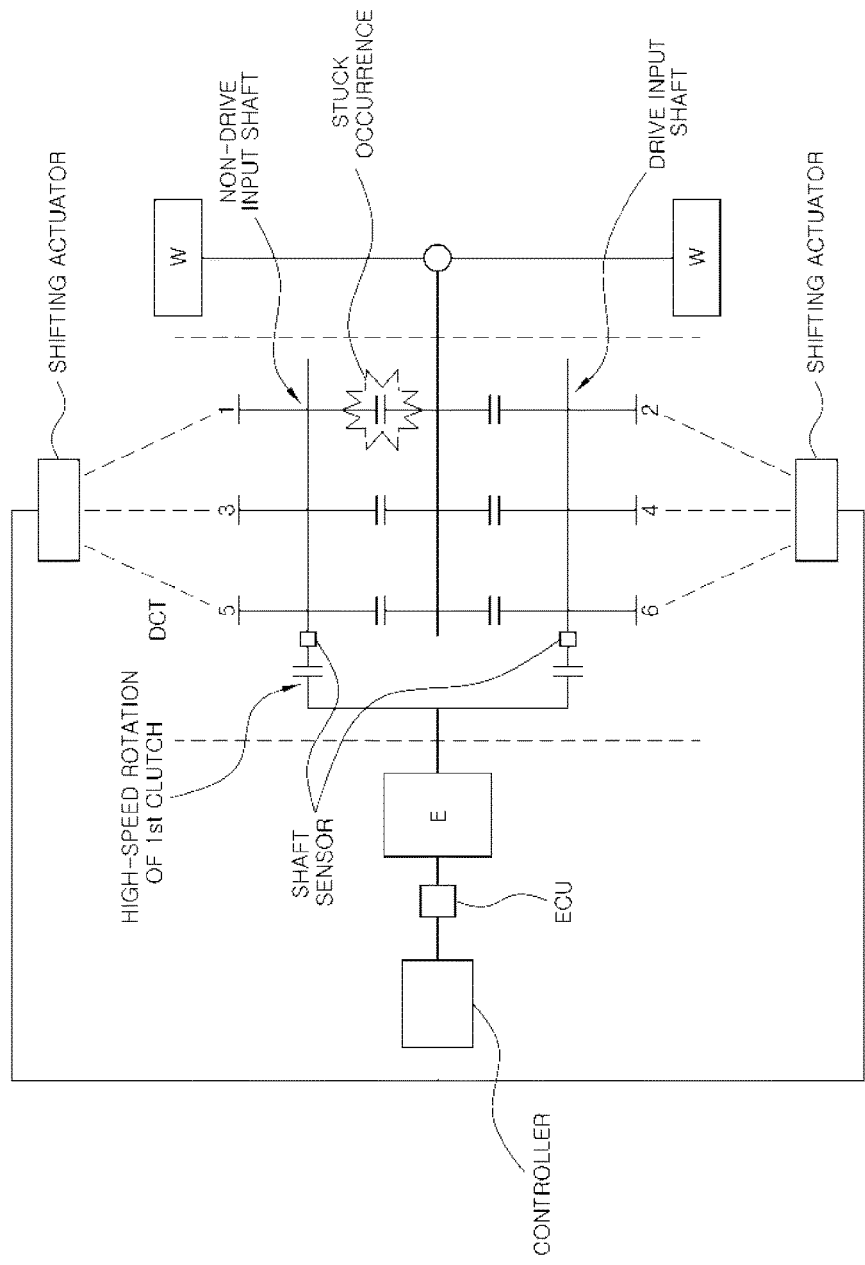
FIG. 2 is a view showing the configuration of a transmission when a stuck phenomenon occurs on a low shift gear of a non-drive input shaft and thus a clutch of the non-drive input shaft is rotated at abnormally high speed according to the related art.
Figure 3:
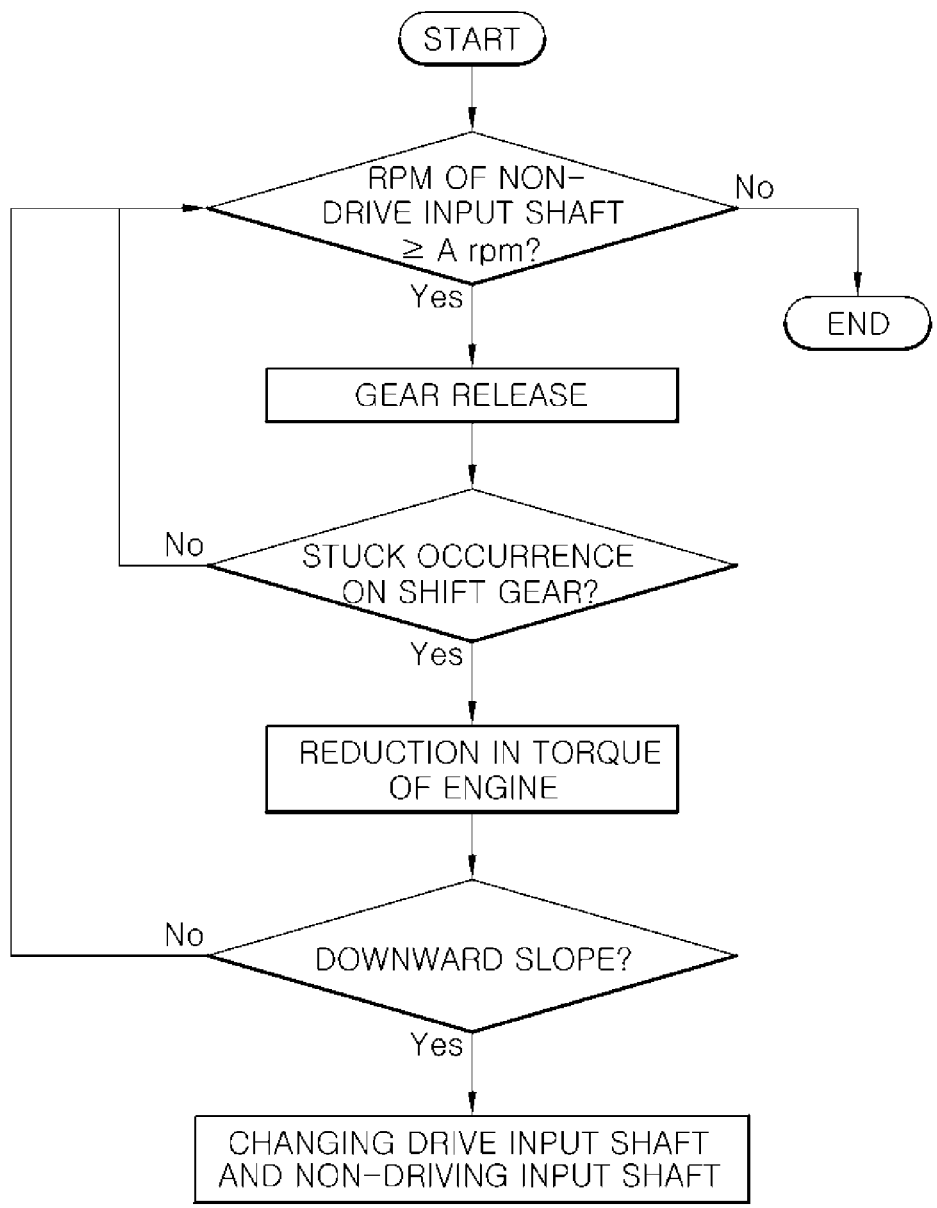
FIG. 3 is a flowchart illustrating an exemplary clutch burst prevention method according to the present invention.

As shown in FIG. 3, the clutch burst prevention method according to various embodiments of the present invention starts from monitoring the RPM of a non-drive input shaft. The RPM of the drive shaft and the RPM of the non-drive shaft are measured by shaft sensor installed at each shaft and are transmitted to a controller.

If the RPM of the non-drive input shaft is increased to a preset clutch burst reference RPM or more, all gears coupled to the non-drive input shaft are released to solve this problem. As such, when the gears are released, rotating force transmitted from wheels is not transmitted to the non-drive input shaft. Thereby, the RPM of the non-drive input shaft can be reduced.

Here, the clutch burst reference RPM is preferably set to an RPM corresponding to a warning section in which the probability of occurrence of clutch burst is increased, rather than an RPM at which clutch burst occurs. The RPM at which clutch burst occurs varies depending on a variety of variables such as the kind of vehicle, the kind of transmission, the material of the clutch, etc. Preferably, an RPM corresponding to 70% to 90% of the RPM at which a clutch burst phenomenon of the corresponding clutch occurs is set to the clutch burst reference RPM.

If a stuck phenomenon occurs while separating gears and thus the gears are not separated from each other, an alternative measure of reducing the torque of the engine is conducted. If the driving speed of the vehicle, that is, the RPM of the wheels, is reduced, the RPM of the non-drive input shaft is also reduced in conduction with this. Consequently, the RPM of the clutch is reduced, whereby the risk of clutch burst is reduced.

Here, if the shifting gears coupled to the non-drive input shaft are not released when a controller releases gears from non-drive input shaft through shifting actuator, it is possible to detect whether or not the stuck phenomenon has occurred.

Further, the controller requests reducing a torque of an engine to ECU when a stuck phenomenon occurs on a shift gear of the non-drive input shaft, thereby the torque of the engine is reduced. However, sometimes the RPM of the wheels may not be reduced only by reducing the torque of the engine. The case where the vehicle is in an inertia driving state, e.g., moving on a downward slope, is a representative example. While the vehicle moves on a downward slope, even though the torque of the engine is reduced, the driving speed of the vehicle may be increased. Therefore, in a problematic situation in which the non-drive shaft is rotated through a gear involved with a stuck phenomenon, even if the torque of the engine is reduced, the RPM of the non-drive input shaft may be increased to the clutch burst reference RPM.

Given this, in the present invention, if the RPM of the non-drive input shaft is not reduced even when the torque of the engine is reduced, it is determined that the vehicle moves on a downward slope, and thus the non-drive input shaft and the drive input shaft are changed with each other.

As such, when the non-drive input shaft and the drive input shaft are changed with each other, the input shaft connected to the shift gear involved with the stuck phenomenon becomes the drive input shaft. Since the RPM of the drive input shaft is limited by the torque of the engine, the RPM of the clutch that is in an over-rotation state because of a stuck phenomenon can be reduced.

The above-mentioned explanation is applied to the case where the shift gear of the non-drive input shaft involved with a stuck phenomenon is a first or second gear. In the case of a low gear such as a first or second gear, when the wheels are rotated at high speed, the input shaft is rotated at higher speed. Thus, there is high probability of occurrence of a clutch burst phenomenon. Meanwhile, when a stuck phenomenon occurs at a middle or high gear stage, which is a third or more gear stage, even though the wheels are rotated at high speed, the RPM of the input shaft is not higher than the RPM at which clutch burst occurs. Therefore, in this case, the above-mentioned measures are not required.

For the sake of better understanding, the operation relationship will be explained on the assumption that the input shaft that is connected from the beginning to the engine and is receiving drive force from the engine is set as a first shaft and the non-drive input shaft in which a stuck phenomenon occurs on a shift gear is set as a second shaft. When the drive force is transmitted to the wheels by the first shaft that is connected as the drive shaft to the engine, the rotation of the wheels is reversely transmitted to the second shaft that is the non-drive shaft, thus rotating the second shaft.

Here, the RPM of the first shaft is not significantly different from that of the second shaft when it is in the normal operation. The reason for this is because a shift gear coupled to the first shaft and a shift gear coupled to the second shaft are coupled to adjacent gear stages, for example, if the first shaft is coupled to the second gear stage, the second shaft is coupled to the first or third gear stage. However, there may be a problem of the RPM of the second shaft being excessively increased by an abnormal gear operation such as the case where when the first shaft is coupled to the sixth gear stage and thus the vehicle moves at a speed corresponding to the sixth gear stage, the second shaft is coupled to the first gear stage or the like.

When this problem is caused, the gear coupled to the second shaft is released as a primary solution. When this gear is released, the drive force that rotates the second shaft is interrupted, whereby clutch burst can be prevented.

However, if the associated gear is not released because of a stuck phenomenon, the operation of reducing the torque of the engine is conducted as a secondary solution to reduce the driving speed of the vehicle itself and thus reduce the RPM of the wheels. When the RPM of the wheels is reduced, the RPM of the second shaft that is rotated in conjunction with the rotation of the wheels is also reduced, whereby clutch burst can be prevented.

Here, if the vehicle is moving on a downward slope, the driving speed of the vehicle is not reduced even though the torque of the engine is reduced. Therefore, the RPM of the second shaft is not also reduced. Thus, if the above-mentioned problem occurs while the vehicle moves on a downward slope, the operation of separating the first shaft from the engine to make it become a non-drive shaft and coupling the second shaft to the engine to make it become a drive shaft is conducted as a final solution. In typical DCTs, changing the drive shaft means shifting gears. In the above case, changing the drive shaft is to couple the second shaft that is rotating at high speed to the engine and limit the RPM of the second shaft in response to the RPM of the engine. That is, because the torque of the engine is previously reduced, the RPM of the second shaft is limited by the reduced torque of the engine when the second shaft is coupled to the engine. As a result, clutch burst can be prevented.

A clutch burst prevention method according to the present invention has the following effects.

First, clutch burst can be prevented by controlling the RPM of a non-drive input shaft.

Second, even if a transmission malfunctions when the vehicle is under acceleration conditions, e.g., when it moves on a downward slope, clutch burst can be reliably prevented.

Third, as clutch burst can be prevented, occupants of a vehicle can be prevented from being in danger because of clutch burst.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch burst prevention method for preventing a non-drive input shaft clutch of a vehicle provided with a double clutch transmission (DCT) from damage, the clutch burst prevention method comprising:
 a torque reduction operation of reducing a torque of an engine by an ECU when a stuck phenomenon occurs on a shift gear of the non-drive input shaft.

2. The clutch burst prevention method according to claim 1, further comprising, after the torque reduction operation:
 a downward-slope determination operation of determining whether the vehicle is moving on a downward slope; and
 an operation of changing the non-drive input shaft and a drive input shaft with each other when it is determined that the vehicle is moving on the downward slope.

3. The clutch burst prevention method according to claim 2, further comprising, before the torque reduction operation:
 an over-rotation determining operation of determining whether revolutions per minute (RPM) of the non-drive input shaft is greater than or equal to a clutch burst reference RPM value; and
 a gear separation operation of separating the shift gear of the non-drive input shaft when the RPM of the non-drive input shaft is greater than or equal to the clutch burst reference RPM value,
 wherein, in the gear separation operation, when the shift gear is not separated, it is determined that a stuck phenomenon has occurred.

4. The clutch burst prevention method according to claim 2, wherein the downward-slope determination operation comprises determining that the vehicle is moving on the downward slope when the RPM of the non-drive input shaft is not reduced even when the torque of the engine is reduced in the torque reduction operation.

5. The clutch burst prevention method according to claim 2, wherein when the shift gear of the non-drive input shaft on which the stuck phenomenon occurs is a first or second gear, the torque reduction operation is conducted.

* * * * *